(12) United States Patent
Zhou et al.

(10) Patent No.: US 11,103,897 B2
(45) Date of Patent: Aug. 31, 2021

(54) EFFICIENT FLEXIBLE SORTING DEVICE FOR MATERIAL FLOW

(71) Applicant: Shanghai guanmei intelligent logistics technology co., LTD, Shanghai (CN)

(72) Inventors: Weilong Zhou, Shanghai (CN); Junkui Shi, Shanghai (CN)

(73) Assignee: SHANGHAI GUANMEI INTELLIGENT LOGISTICS TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/754,757

(22) PCT Filed: Aug. 9, 2019

(86) PCT No.: PCT/CN2019/099903
§ 371 (c)(1),
(2) Date: Apr. 9, 2020

(87) PCT Pub. No.: WO2020/063133
PCT Pub. Date: Apr. 2, 2020

(65) Prior Publication Data
US 2021/0197232 A1    Jul. 1, 2021

(30) Foreign Application Priority Data
Sep. 27, 2018 (CN) .......................... 201811129332.4

(51) Int. Cl.
*B65G 39/12* (2006.01)
*B65G 39/20* (2006.01)
(Continued)

(52) U.S. Cl.
CPC ............... *B07C 3/08* (2013.01); *B65G 39/12* (2013.01); *B65G 39/20* (2013.01);
(Continued)

(58) Field of Classification Search
CPC ........ B65G 39/12; B65G 39/20; B65G 47/74; B07C 3/08
(Continued)

(56) References Cited

U.S. PATENT DOCUMENTS 3,814,415 A    6/1974  Hunter et al.
5,697,777 A *  12/1997 Arai .......................... F26B 3/00
                                                            432/59
(Continued)

FOREIGN PATENT DOCUMENTS

CN      105583160 A      5/2016
CN      107265079 A      10/2017
(Continued)

*Primary Examiner* — Douglas A Hess
(74) *Attorney, Agent, or Firm* — Bayramoglu Law Offices LLC

(57) ABSTRACT

An efficient flexible sorting device for material flow is provided. The gear A is driven by the rotating motor, and the gear A meshes with the gear B, so that the rotating body can be rotated relative to the main frame according to the sorting direction actually required. The belt motor rotates the driving shaft through the small synchronous pulley, the synchronous belt, and the large synchronous pulley. The driving shaft drives the belt to move along the tensioning roller, the driving shaft, and the guiding pulley. The relative position of the tensioning roller and the rotating body is adjusted through the bolt F, the fixing plate and the nut F to ensure that the belt is tensioned, thereby realizing the sorting process.

3 Claims, 3 Drawing Sheets

(51) Int. Cl.
*B65G 47/74* (2006.01)
*B07C 3/08* (2006.01)

(52) U.S. Cl.
CPC ............... *B65G 2201/0285* (2013.01); *B65G 2812/02089* (2013.01); *B65G 2812/02217* (2013.01)

(58) Field of Classification Search
USPC ............... 198/370.09, 608, 773, 774.1, 777
See application file for complete search history.

(56) References Cited

U.S. PATENT DOCUMENTS

| | | | | |
|---|---|---|---|---|
| 5,868,238 | A * | 2/1999 | Bonnet | B65G 13/10 198/370.1 |
| 5,918,723 | A * | 7/1999 | Schuitema | B65G 47/684 198/347.4 |
| 7,290,649 | B2 * | 11/2007 | Wolkerstorfer | B65G 13/073 198/781.01 |
| 7,854,314 | B2 * | 12/2010 | Pelak | B65G 13/04 198/572 |
| 7,931,138 | B2 * | 4/2011 | Kim | B65G 47/8823 198/468.6 |
| 9,376,268 | B2 * | 6/2016 | Schiavina | B65G 37/00 |
| 9,573,772 | B2 * | 2/2017 | Fourney | B65G 39/12 |
| 9,745,143 | B2 * | 8/2017 | Wilkins | B65G 47/53 |
| 10,457,495 | B2 * | 10/2019 | Stefanko | B65G 47/2445 |
| 10,640,303 | B2 * | 5/2020 | Kuhn | B65G 15/42 |

FOREIGN PATENT DOCUMENTS

| | | |
|---|---|---|
| CN | 206634662 U | 11/2017 |
| CN | 209124393 U | 7/2019 |
| FR | 949441 A | 8/1949 |

* cited by examiner ent of International Application No. PCT/CN2019/099903, filed on Aug. 9, 2019, which is based upon and claims priority to Chinese Patent Application No. 201811129332.4, filed on Sep. 27, 2018, the entire contents of which are incorporated herein by reference.

TECHNICAL FIELD

The present invention relates to industries such as material transportation and material transfer, and more specifically relates to a high-efficiency sorting device available for complicated types of materials to be sorted.

BACKGROUND

Traditional material sorting devices commonly include an annular cross-belt sorting device or a swing-arm sorting device. The annular cross-belt type sorting device typically occupies a substantial amount of space, lacks efficiency and is expensive to operate and maintain. Such devices are often not suitable for small and medium-sized sorting stations and operations. The swing-arm type sorting device has low efficiency and can easily damage materials and persons because of its moving arm.

Therefore, there is a need for a new sorting device for high volume material flow. The new sorting device should be smaller in size and expense so it is better suited for smaller facilities and operations, but yet remain capable of handling a high volume of material efficiently without moving arms or parts that can cause harm to persons and property.

SUMMARY

To solve the above technical problems, the present invention proposes the following technical solutions:

An efficient flexible sorting device for material flow is provided, including: a main frame, a rotating body, a tensioning roller, a sliding bearing, a driving shaft, a bolt 6, an end cover, a bolt 8, a rotating motor, a bolt 10, a nut 11, a bolt 12, a nut 13, a shaft sleeve, an upper bearing, a shaft, a gear 17, a lower bearing, a gear 19, a bolt 20, a supporting frame, a bolt 22, a fixing plate, a nut 24, a large synchronous pulley, a small synchronous pulley, a synchronous belt, a belt motor, a bolt 29, a belt, a guiding pulley, a screw, a roller 33, a roller 34, and a roller 35. The tensioning roller is mounted on the rotating body, the bolts 22 are fixed to both ends of the tensioning roller, and the bolts 22 are screwed to the fixing plate. The driving shaft forms a revolute joint with the rotating body through the sliding bearings mounted at both ends of the driving shaft. The large synchronous pulley is mounted at one end of the driving shaft. The belt motor is fixed to the rotating body by the bolts 29, the small synchronous pulley is mounted at an end of the belt motor, and the synchronous belt is mounted on the large synchronous pulley and the small synchronous pulley.

The shaft is fixed to the lower part of the rotating body by the bolt 10 and the nut 11. The upper bearing is mounted on the upper part of the shaft and the lower bearing is mounted on the lower part of the shaft. The shaft is fixed to the lower part of the shaft sleeve through the end cover and the bolt 8. A revolute joint is provided between the shaft sleeve and the shaft. The gear 19 is mounted on an end of the shaft. The rotating motor is fixed on the main frame, and the gear 17 is mounted on a shaft end of the rotating motor. The gear 17 meshes with the gear 19. One end of the supporting frame is fixed to the shaft sleeve by the bolt 20, and the other end is fixed to the main frame by the bolt 12 and the nut 13. The main frame is provided with the long holes at the corresponding positions for fixing the bolts 12, and the bolt 6 for height adjusting is mounted at the corresponding position of the main frame.

The guiding pulley is mounted on the upper part of the rotating body by the screws. The belt is provided on the outer periphery of the guiding pulley. The roller 33, roller 34, and roller 35 are mounted at each of four corners of the main frame.

The device can conveniently adjust the relative height of the main frame and the supporting frame through the long holes and the bolt 6 arranged at the corresponding positions of the bolt 12 of the main frame, and accordingly, the heights of the rotating body, the guiding pulley, and the belt are finally adjusted.

The gear 17 is driven by the rotating motor, and the gear 17 meshes with the gear 19, so that the rotating body can be rotated relative to the main frame according to the sorting direction actually required. The belt motor rotates the driving shaft through the small synchronous pulley, the synchronous belt, and the large synchronous pulley. The driving shaft drives the belt to move along the tensioning roller, the driving shaft, and the guiding pulley. The relative position of the tensioning roller and the rotating body is adjusted through the bolt 22, the fixing plate and the nut 24 to ensure that the belt is tensioned, thereby realizing the sorting process.

The sorting device obtained by the above technical solution solves the technical problems of the large size, high cost, low sorting efficiency, and high failure rate in traditional sorting devices. The sorting device of the present invention has a simple structure and high safety performance, is easy to manufacture, install, dismantle and maintain. The new user friendly sorting device of the invention reduces the weight of the whole machine, saves manufacturing costs and makes the operation safer to persons and property.

In the figures: 1—main frame; 2—rotating body; 3—tensioning roller; 4—sliding bearing; 5—driving shaft; 6—bolt; 7—end cover; 8—bolt; 9—rotating motor; 10—bolt; 11—nut; 12—bolt; 13—nut; 14—shaft sleeve; 15—upper bearing; 16—shaft; 17—gear; 18—lower bearing; 19—gear; 20—bolt; 21—supporting frame; 22—bolt; 23—fixing plate; 24—nut; 25—large synchronous pulley; 26—small synchronous pulley; 27—synchronous belt;

28—belt motor; 29—bolt; 30 belts; 31—guiding pulley; 32—screw; 33—roller; 34—roller; 35—roller; and 36—long hole.

DETAILED DESCRIPTION OF THE EMBODIMENTS

Figure 1:
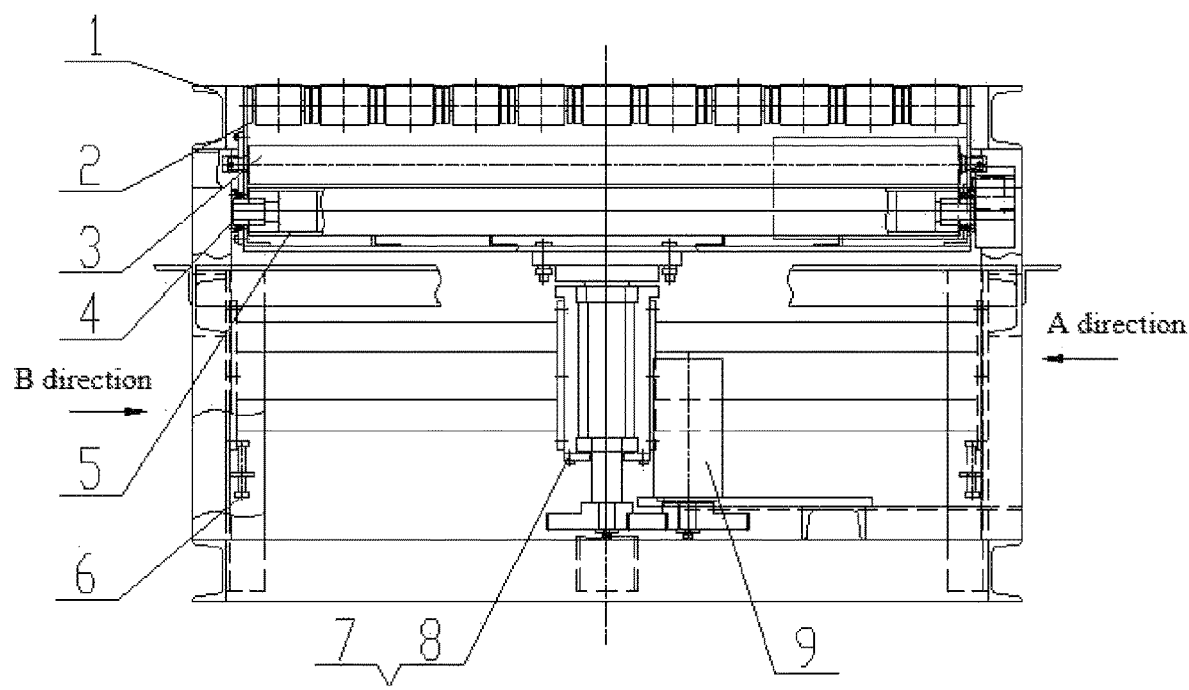
FIG. 1 is a front view of the material sorting device of the invention.
Figure 4:
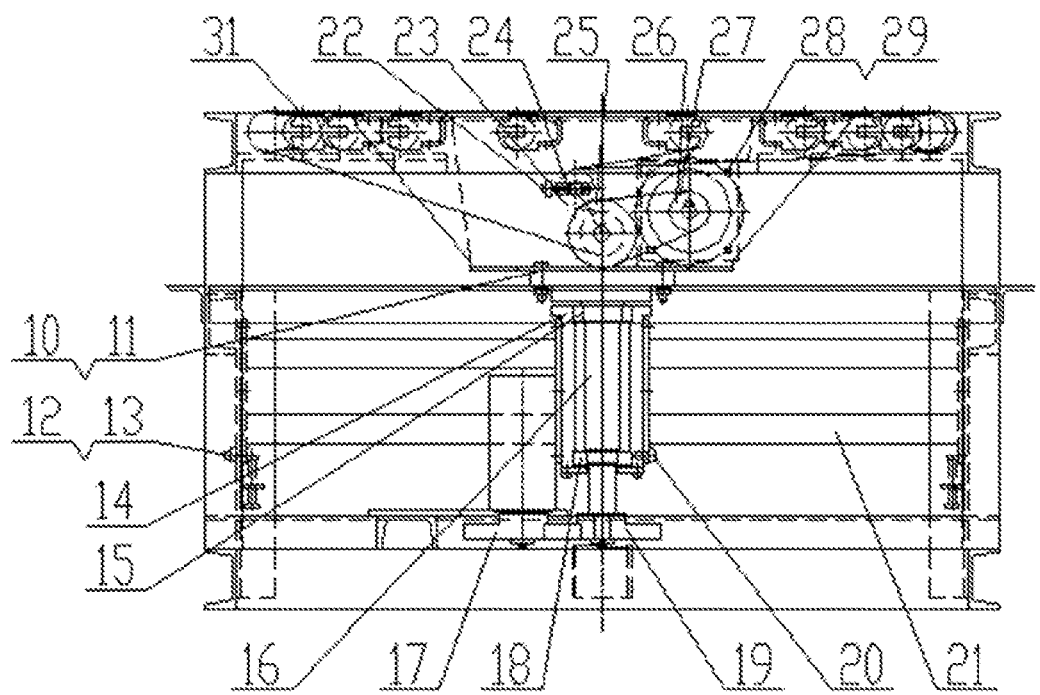
FIG. 4 is another side view of the sorting device of FIG. 1 in the direction of arrow A.
Figure 5:
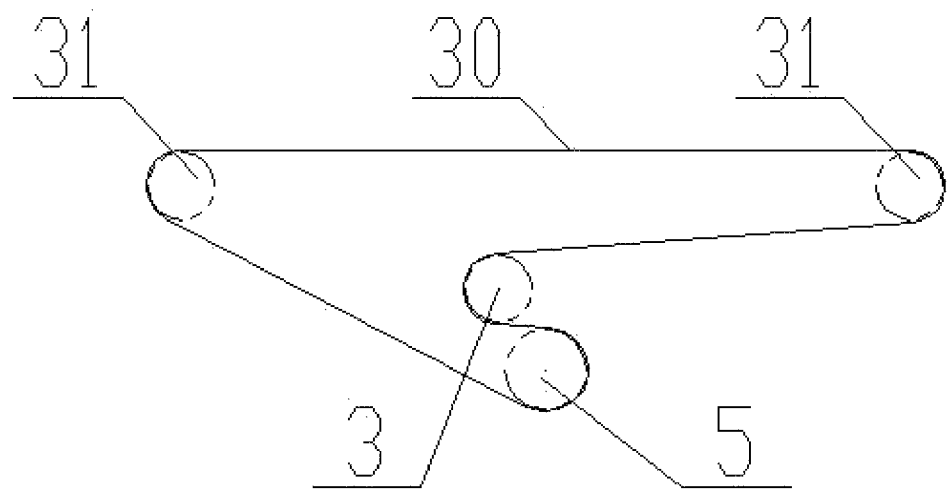
FIG. 5 is a schematic diagram showing an embodiment of the belt winding of the invention.

The present invention is described in detail below with reference to the drawings:

The material sorting device includes a tensioning roller 3 is mounted on rotating body 2. Bolts 22 are fixed to the both ends of the tensioning roller, and the bolts 22 are screwed to the fixing plate 23. The driving shaft 5 forms a revolute joint with the rotating body 2 through the sliding bearings 4 mounted at both ends of the driving shaft 5. The large synchronous pulley 25 is mounted at one end of the driving shaft 5. The belt motor 28 is fixed to the rotating body 2 by the bolts 29. Moreover, the small synchronous pulley 26 is mounted at an end of the belt motor 28, and the synchronous belt 27 is mounted on the large synchronous pulley 25 and the small synchronous pulley 26, as shown in FIGS. 1 and 4.

Figure 2:
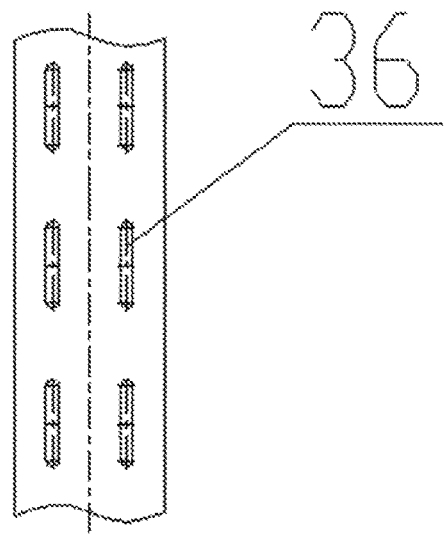
FIG. 2 is a side transparent view of the sorting device of FIG. 1 in the direction of arrow B.

The shaft 16 is fixed to the lower part of the rotating body 2 by the bolt 10 and the nut 11. The upper bearing 15 is mounted on the upper part of the shaft 16 and the lower bearing 18 is mounted on the lower part of the shaft 16. The shaft 16 is fixed to the lower part of the shaft sleeve 14 through the end cover 7 and the bolt 8. There is a revolute joint between the shaft sleeve 14 and the shaft 16. The gear 19 is mounted on an end of the shaft 16. The rotating motor 9 is fixed on the main frame 1, and the gear 17 is mounted on a shaft end of the rotating motor 9. The gear 17 meshes with the gear 19. One end of the supporting frame 21 is fixed to the shaft sleeve 14 by the bolt 20, and the other end is fixed to the main frame 1 by the bolt 12 and the nut 13. The main frame 1 is provided with the long holes 36 at the corresponding positions for fixing the bolt 12, and the bolt 6 for height adjusting is mounted at the corresponding position of the main frame 1, as shown in FIGS. 1, 2 and 4.

Figure 3:
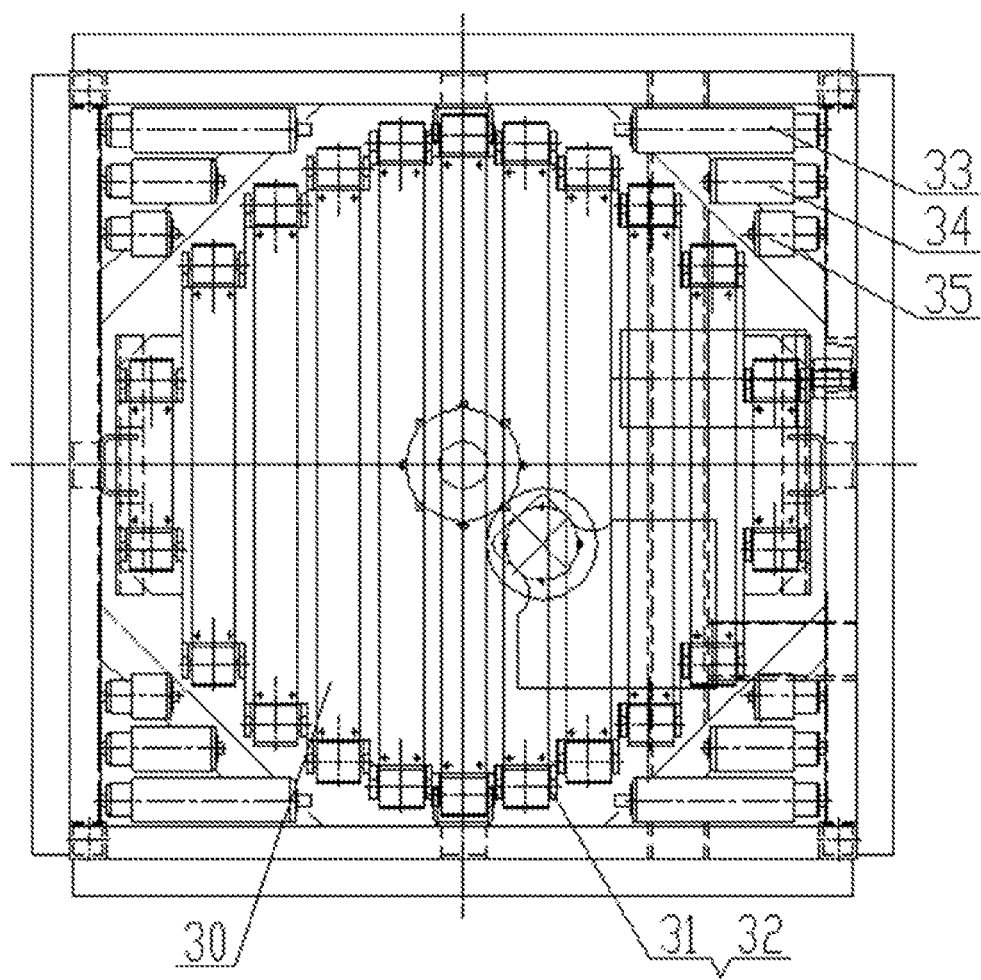
FIG. 3 is a top plan view of the sorting device of FIG. 1.

The guiding pulley 31 is further mounted on the upper part of the rotating body 2 by the screws 32. The belt 30 is provided on the outer periphery of the guiding pulley 31. The rollers 33, 34, and 35 are mounted at each of the four corners of the main frame 1, as shown in FIG. 3.

In summary, the present invention can conveniently adjust the relative height of the main frame 1 and the supporting frame 21 through the long holes 36 and the bolt 6 designed at the corresponding positions of the bolt 12 of the main frame 1. Thus, the heights of the rotating body 2, the guiding pulley 31, and the belt 30 are finally adjusted, as shown in FIGS. 1 and 2. The gear 17 is driven by the rotating motor 9, and the gear 17 meshes with the gear 19, so that the rotating body 2 can be rotated relative to the main frame 1 according to the sorting direction actually required. The belt motor 28 rotates the driving shaft 5 through the small synchronous pulley 26, the synchronous belt 27, and the large synchronous pulley 25. The driving shaft 5 drives the belt 30 to move along the tensioning roller 3, the driving shaft 5, and the guiding pulley 31. The relative position of the tensioning roller 3 and the rotating body 2 is adjusted through the bolt 22, the fixing plate 23 and the nut 24 to ensure that the belt 30 is tensioned, thereby realizing the sorting process, as shown in FIGS. 1 and 3-5.

It should be noted that, in the present application, the number of the guiding pulley 31, the belt 30, the roller 33, the roller 34, and the roller 35 is not limited to FIGS. 1 and 3-5.

What is claimed is:

1. An efficient flexible sorting device for material flow, comprising: a main frame, a rotating body, a tensioning roller, sliding bearings, a driving shaft, a first bolt, an end cover, a second bolt, a rotating motor, a third bolt, a first nut, at least two fourth bolts, a second nut, a shaft sleeve, an upper bearing, a shaft, a first gear, a lower bearing, a second gear, a fifth bolt, a supporting frame, two sixth bolts, a fixing plate, a third nut, a large synchronous pulley, a small synchronous pulley, a synchronous belt, a belt motor, at least one seventh bolt, a belt, a guiding pulley, a screw, a first roller, a second roller, and a third roller, wherein
the tensioning roller is mounted on the rotating body, one of the sixth bolts is fixed to one end of the tensioning roller and a second of the sixth bolts is fixed to another end of the tensioning roller, each of the sixth bolts are screwed to the fixing plate, the driving shaft forms a revolute joint with the rotating body through the sliding bearings mounted at both ends of the driving shaft, the large synchronous pulley is mounted at one end of the driving shaft, the belt motor is fixed to the rotating body by the at least one seventh bolt, the small synchronous pulley is mounted at an end of the belt motor, and the synchronous belt is mounted on the large synchronous pulley and the small synchronous pulley.

2. The efficient flexible sorting device for the material flow according to claim 1, wherein the shaft is fixed to a lower part of the rotating body by the third bolt and the first nut, the upper bearing is mounted on an upper part of the shaft and the lower bearing is mounted on a lower part of the shaft, the shaft is fixed to a lower part of the shaft sleeve through the end cover and the second bolt, a revolute joint is provided between the shaft sleeve and the shaft, the second gear is mounted on an end of the shaft, the rotating motor is fixed on the main frame, and the first gear is mounted on a shaft end of the rotating motor, the first gear meshes with the second gear, a first end of the supporting frame is fixed to the shaft sleeve by the fifth bolt, and a second end of the supporting frame is fixed to the main frame by the fourth bolt and the second nut, the main frame is provided with long holes at positions for fixing the at least two fourth bolts, and the first bolt for height adjusting is mounted at the positions for fixing the at least two fourth bolts on the main frame.

3. The efficient flexible sorting device for the material flow according to claim 1, wherein the guiding pulley is further mounted on an upper part of the rotating body by the screws, the belt is provided on an outer periphery of the guiding pulley, the first roller, the second roller, and the third roller are mounted at each of four corners of the main frame.

* * * * *